US008624958B2

(12) United States Patent
Mendoza et al.

(10) Patent No.: US 8,624,958 B2
(45) Date of Patent: *Jan. 7, 2014

(54) METHOD AND APPARATUS FOR ACCESSING MULTI-DIMENSIONAL MAPPING AND INFORMATION

(75) Inventors: Felipe Mendoza, Dallas, TX (US); Ward Harnish Loving, Columbus, GA (US)

(73) Assignee: True Voyager, LLC, Dallas, TX (US)

( * ) Notice: Subject to any disclaimer, the term of this patent is extended or adjusted under 35 U.S.C. 154(b) by 701 days.

This patent is subject to a terminal disclaimer.

(21) Appl. No.: 12/778,657

(22) Filed: May 12, 2010

(65) Prior Publication Data

US 2010/0220174 A1    Sep. 2, 2010

Related U.S. Application Data

(63) Continuation of application No. 11/154,209, filed on Jun. 16, 2005, now Pat. No. 7,746,376.

(60) Provisional application No. 60/580,059, filed on Jun. 16, 2004.

(51) Int. Cl.
*H04N 7/00* (2011.01)

(52) U.S. Cl.
USPC .............................. 348/39; 348/36

(58) Field of Classification Search
USPC ............................. 348/36, 37, 39
See application file for complete search history.

(56) References Cited

U.S. PATENT DOCUMENTS

| | | | |
|---|---|---|---|
| 6,157,385 A | 12/2000 | Oxaal | |
| 6,243,099 B1 | 6/2001 | Oxaal | |
| 6,252,603 B1 | 6/2001 | Oxaal | |
| 6,271,853 B1 | 8/2001 | Oxaal | |
| 6,323,862 B1 | 11/2001 | Oxaal | |
| 6,731,284 B1 | 5/2004 | Oxaal | |
| 7,239,760 B2 | 7/2007 | Di Bernardo et al. | |
| 7,542,035 B2 | 6/2009 | Oxaal | |
| 7,577,316 B2 | 8/2009 | Di Bernardo et al. | |
| 7,805,025 B2 | 9/2010 | Di Bernardo et al. | |
| 7,813,596 B2 | 10/2010 | Di Bernardo et al. | |
| 8,077,176 B2 | 12/2011 | Oxaal | |

FOREIGN PATENT DOCUMENTS

WO    WO-2004/017233 A1 *   2/2004   .............. G06F 17/60

* cited by examiner

*Primary Examiner* — Allen Wong
(74) *Attorney, Agent, or Firm* — Booth Albanesi Schroeder LLC (57) ABSTRACT

A method and apparatus for providing an interactive mapping and panoramic imaging application for utilization by a computer user is provided. A plurality of panoramic images are stored on a panoramic database, each panoramic image corresponding to a geographical location. A panoramic image is displayed on a screen and is navigable in response to input by the user. The panoramic image has embedded hotspots corresponding to selected panoramic images of geographically adjacent locations. Also displayed on the screen, simultaneously with the panoramic image, is a map image corresponding with the panoramic image. The map image is stored on a map database, and the map is navigable in response to input by the user. The map has embedded hotspots corresponding to the plurality of panoramic images. Also displayed on the screen, simultaneously with the panoramic image and the map image, is a text panel displaying textual information corresponding to the displayed panoramic image. The text panel is capable of receiving textual input from the user for activating a search of a text database having a plurality of text data corresponding to the plurality of panoramic images. The displayed panoramic image, the displayed map image and the displayed textual information are updated in response to the user activating a hotspot, such that the displayed panoramic image, the displayed map image and the displayed textual information correspond to one another.

43 Claims, 7 Drawing Sheets

METHOD AND APPARATUS FOR ACCESSING MULTI-DIMENSIONAL MAPPING AND INFORMATION

CROSS-REFERENCE TO RELATED APPLICATIONS

This application is a continuation of U.S. patent application Ser. No. 11/154,209 filed Jun. 16, 2005 now U.S. Pat. No. 7,746,376 entitled "METHOD AND APPARATUS FOR ACCESSING MULTI-DIMENSIONAL MAPPING AND INFORMATION" which claimed the benefit of U.S. Provisional Application No. 60/580,059 filed Jun. 16, 2004.

STATEMENT REGARDING FEDERALLY SPONSORED RESEARCH OR DEVELOPMENT

Not applicable

REFERENCE TO MICROFICHE APPENDIX

Not applicable

FIELD OF INVENTION

This invention relates generally to viewing map and visual data, and more specifically to method and apparatus for simultaneously viewing navigable panoramic images and corresponding navigable map images and information.

BACKGROUND OF THE INVENTION

Using overhead, 2-D map images or bird's-eye-view map images in computer based applications has become commonplace. Typically these maps are navigable by the user and can be panned in selected directions by use of a mouse, keyboard or other input device. Usually these maps can be selectively zoomed in or out to show a larger or smaller geographical area. Often, as the image is zoomed in, more detailed information will appear on the map, such as street names, points of interest, elevations, etc. Further, these mapping images are often linked to a text panel in which the user can input textual search information, such as an address, zip code, street intersections, a business name or type, etc. Upon activating the search, by hitting "enter" for example, the application will conduct a search of a text database and either display a map corresponding to matching textual information, provide a list of matching data from which the user can select or indicates that no matches were found. One such map application is available on Yahoo! (trademark) Maps, such as at http://www.maps.yahoo.com. However, these map applications have shortcomings in that they do not provide a picture or movie image of the indicated location. As such, the user is not able to see what the location looks like without visiting the location in person.

Using picture or movie images in computer-based applications enables a user to see how a location appears. However, typical images present only a limited view of a location in that the image does not supply a rotatable 360 degree image. Certain applications provide links between a map image and a photo or movie image corresponding to selected locations on the map. However, these photo images are not panoramic and navigable and so present only a limited, static view of the location. Using panoramic images to present virtual, computer-simulated "tours" of real physical environments is becoming commonplace. Some applications provide links from a map image to corresponding navigable, panoramic images. These navigable images present a 360 degree image of a location and the user can rotate the image to select a view from the location. The viewer displays a portion of the panoramic image and provides a method for panning throughout the image and often for zooming in and out on the image. Typically, these functions are accomplished through a mouse, keyboard or other input device.

A common viewer used to create these tours is sold by Apple Computer Corp. of Cupertino, Calif., under the trademark Quicktime VR. It provides a way to view panoramic images from a web site by using a web browser. Other companies provide services and software to create virtual tours, such as software sold under the trademark BAMBOO at internet site www.bamboo.com and under the trademark iPix at www.ipix.com. While these systems provide for 360 degree panoramic views and navigation of the views by the user, they do not provide for a corresponding link to a map image.

U.S. Pat. No. 6,563,529 to Jongurius presents an Interactive System for Displaying Detailed View and Direction in Panoramic Images and is hereby incorporated in its entirety for all purposes.

U.S. Pat. No. 6,337,683 to Gilbert, et al. presents Panoramic Movies which Simulate Movement through Multidimensional Space and is hereby incorporated in its entirety for all purposes.

U.S. Pat. No. 6,031,541 to Lipscomb, et al. presents a Method and Apparatus for Viewing Panoramic Three Dimensional Scenes and is hereby incorporated in its entirety for all purposes.

U.S. Pat. No. 6,144,958 to Ortega, et al. presents a System and Method for Correcting Spelling Errors in Search Queries and is hereby incorporated in its entirety for all purposes.

U.S. Pat. No. 6,401,084 to Ortega, et al. presents a System and Method for Correcting Spelling Errors in Search Queries using both Matching and Non-Matching search terms and is hereby incorporated in its entirety for all purposes.

U.S. Pat. No. 6,853,993 to Ortega, et al. presents a System and Methods for Predicting Correct Spellings of Terms in Multiple-Term Search Queries and is hereby incorporated in its entirety for all purposes.

U.S. Pat. No. 6,185,558 to Bowman, et al. presents Identifying the Items Most Relevant to a Current Query Based on Items Selected in Connection with Similar Queries and is hereby incorporated in its entirety for all purposes.

U.S. Pat. No. 6,169,986 to Bowman, et al. presents a System and Method for Refining Search Queries and is hereby incorporated in its entirety for all purposes.

U.S. Patent Application Publication No. 2004/0249686 to Murphy presents a Method and Computer Program for Generating Interactive Map-Based Presentation Facilitating Selection of Lodging Property and is hereby incorporated in its entirety for all purposes.

International Publication No. WO 2004/017233 to Norton-Baker presents an Interactive Property Tour and is hereby incorporated in its entirety for all purposes.

Consequently, there is a need for an application that simultaneously provides for a user a map image and a corresponding panoramic image. Further, there is a need for textual information corresponding to the panoramic image, such as geographic and other information.

SUMMARY OF THE INVENTION

A method and apparatus for providing an interactive mapping and panoramic imaging application for utilization by a computer user is provided. A plurality of panoramic images are stored on a panoramic database, each panoramic image corresponding to a geographical location. A panoramic image is displayed on a screen and is navigable in response to input by the user. The panoramic image has embedded hotspots corresponding to selected panoramic images of geographically adjacent locations. Also displayed on the screen, simultaneously with the panoramic image, is a map image corresponding with the panoramic image. The map image is stored on a map database, and the map is navigable in response to input by the user. The map has embedded hotspots corresponding to the plurality of panoramic images. Also displayed on the screen, simultaneously with the panoramic image and the map image, is a text panel displaying textual information corresponding to the displayed panoramic image. The text panel is capable of receiving textual input from the user for activating a search of a text database having a plurality of text data corresponding to the plurality of panoramic images. The displayed panoramic image, the displayed map image and the displayed textual information are updated in response to the user activating a hotspot, such that the displayed panoramic image, the displayed map image and the displayed textual information correspond to one another.

BRIEF DESCRIPTION OF THE DRAWINGS

Drawings of the preferred embodiment of the invention are attached hereto, so that the invention may be better and more fully understood.

Numeral references are employed to designate like parts throughout the various figures of the drawing. Terms such as "left," "right," "horizontal," "vertical," "up" and "down," when used in reference to the drawings, generally refer to orientation of the parts in the illustrated embodiment. The terms used herein are meant only to refer to the relative positions and/or orientations, for convenience, and are not meant to be understood to be in any manner otherwise limiting. Further, dimensions specified herein are intended to provide examples and should not be considered limiting.

DETAILED DESCRIPTION OF PREFERRED EMBODIMENTS OF THE INVENTION

The product consists of numerous photographic or similar images in a database format. The images are panoramas of various locations of interest. The panoramas are viewed with Apple's QuickTime™ VR or similar method. The images have hot spot locations embedded within them that permit the user to navigate to other points in the image database that are adjacent to the image being viewed. The images may have other data associated with them such as street address, zip code, GPS coordinate, Mapsco™ reference or similar, top-down (2-D) map location, property lot size, pertinent historical information, or other. The product is intended to replace or enhance 2-D maps with actual imagery in place of, or in conjunction with, overhead and/or panoramic views of locations. The product can be scaled, for example, from an individual home location to a city area. Preferably, it is intended that images be taken at least every 50 feet within a particular location of interest, although the invention is not limited to such intervals of images.

The product has applications in the real estate business, the travel and tourism industry, personal or commercial auto navigation, and other industries.

Figure 1:
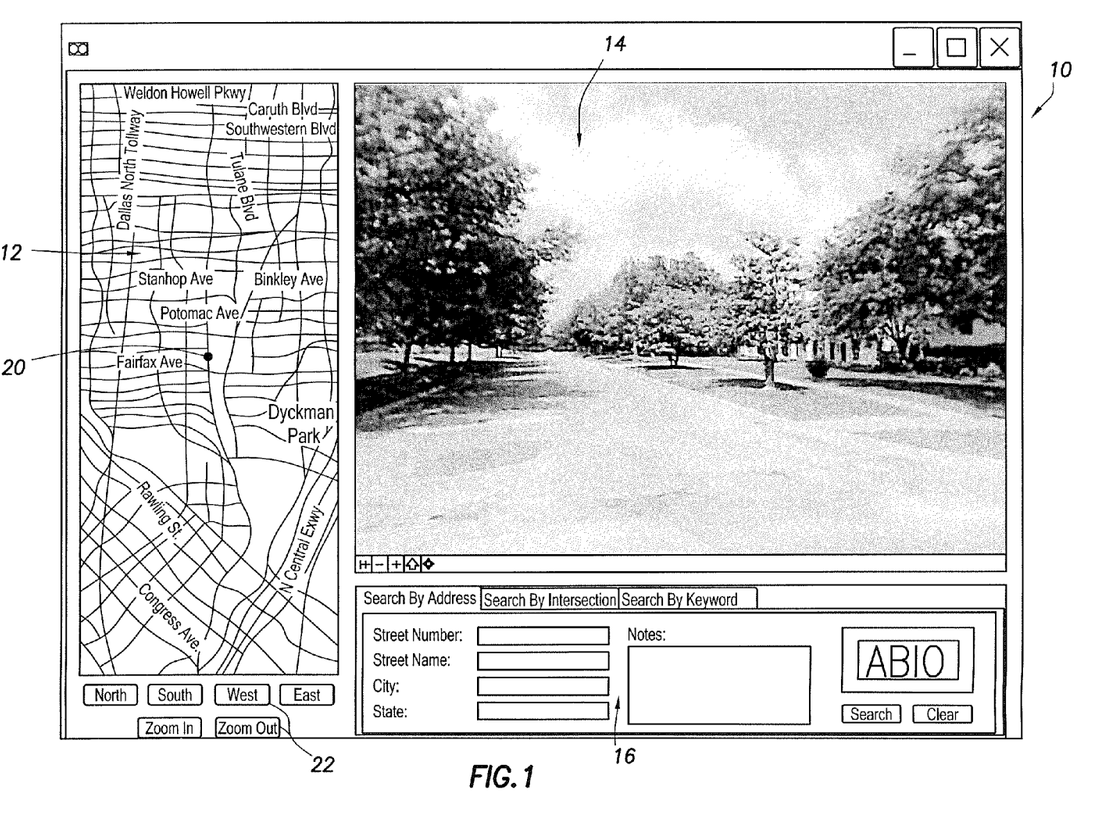
FIG. 1 presents a sample screen having the corresponding panoramic image, map image and text panel of the invention.

FIG. 1 presents a screen 10 having a map image 12, a panoramic image 14 and a text panel 16. Each of these images and panels is simultaneously visible on the screen 10 to the user. FIG. 1 presents a sample screen display embodying aspects of the invention. The screen display is only a sample and could vary greatly in appearance. For example, the relative sizes and positioning of the images is not important to the practice of the invention. The screen 10 can be any visual display, but is preferably a computer screen. The screen 10 can be part of a personal computer system, a network, operated from data received locally, by network or on the internet.

The map image 12 presents an overhead representational map image. The image could alternately incorporate actual overhead photographs, such as are available through the United States Geological Survey (USGS) at its EROS data center, or through the USGS NAPP web site. Information can be superimposed onto such photo images, if desired. The map can include information such as street names, zip codes, landmarks, points of interest, parks, reserves, state and country borders, bodies of water and other information, whether in test or graphic form. The map image 12 is navigable by the user. Typically, the user can employ a mouse input device to point-and-click to a location on the map image and the map image will "shift" or change to place the indicated location in the center of the map image. Alternately, the user can employ directional indicators, such as indicators 22, or other input devices such as a keyboard. Similarly, the user can preferably zoom in and out on the map image 14 by using an input device, indicators, etc. The particular location on which the map is centered can be indicated by a location icon 20, such as a colored dot or pin icon.

Figure 2:
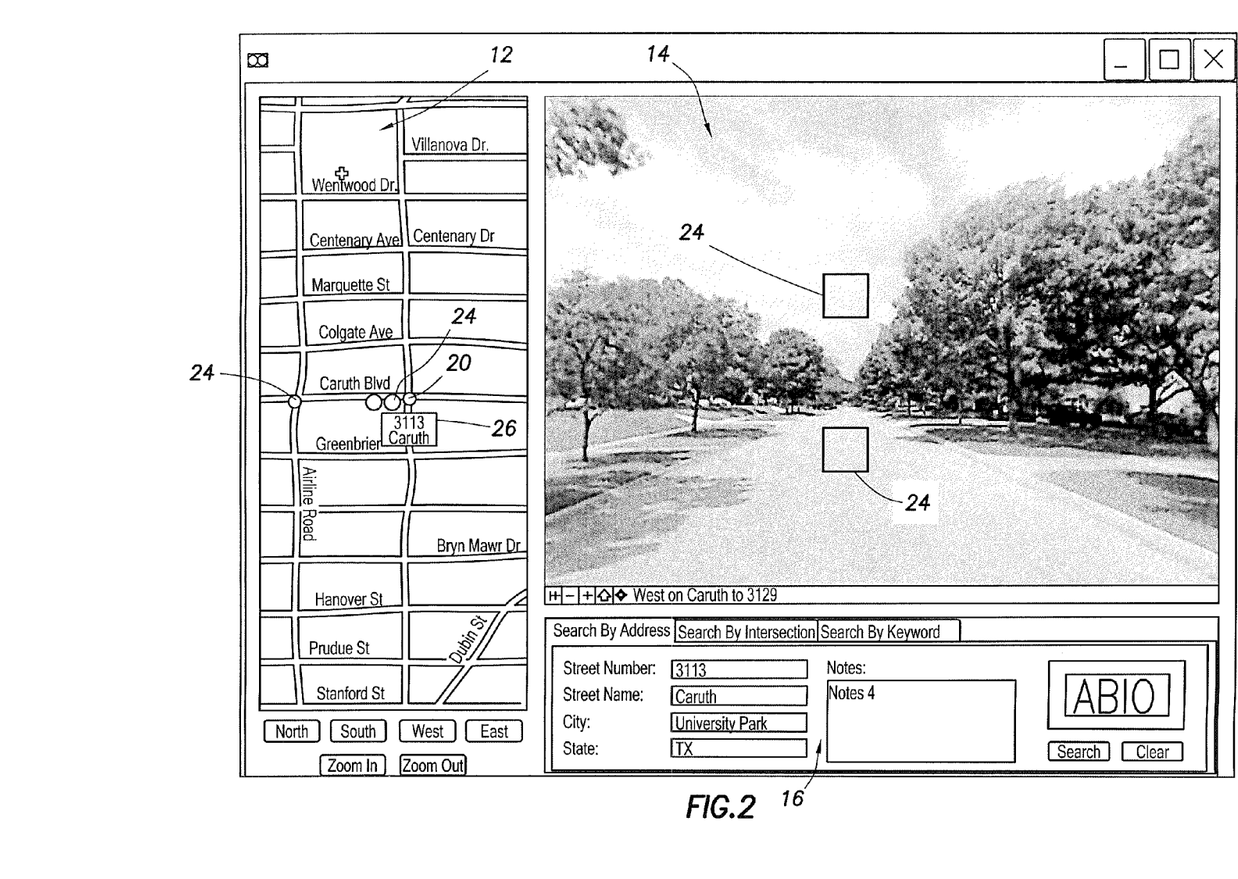
FIG. 2 presents the screen of FIG. 1 with the map image zoomed in and showing further features of the invention.

As seen in FIG. 2, embedded within the map image are a plurality of "hotspots" or links 24, which are linked to panoramic images, as will be explained further herein. The hotspots 24 can be programmed to appear at all times, to appear only when the map is zoomed in to a selected degree, to never appear or to appear only when the user scrolls-over the hotspot 24 with a mouse or other input device. The appearance criteria for the hotspots 24 can also be controlled by the user, if desired. Alternately, the scrolling icon representing the location of the user's mouse or other device on the screen can change to a different icon indicating the presence at that location on the map of a hotspot. A combination of these features may be preferable, such as having the hotspots appear as small white dots, the location in current use appear as a larger red dot, and the mouse indicator appear as an arrow unless it is scrolled-over a hotspot, in which case it changes to appear as a hand, for example. In FIG. 2, the user has zoomed in on the map and activated a hotspot or entered an address in the text panel 16, as will be explained herein. FIG. 2 is an example only and the map image will preferably have a much larger number of hotspots.

The map image 12 may have other functionalities as well. For example, as seen in FIG. 2, other information 27, such as an address, intersection streets, point of interest names, etc., may be employed. The information 27 can indicate information about the location upon which the map is centered, as shown, or can indicate information about other hotspots. Such information 27 can appear when desired, such as always appear, appear upon scroll-over or when indicated by the user, etc.

Figure 3:
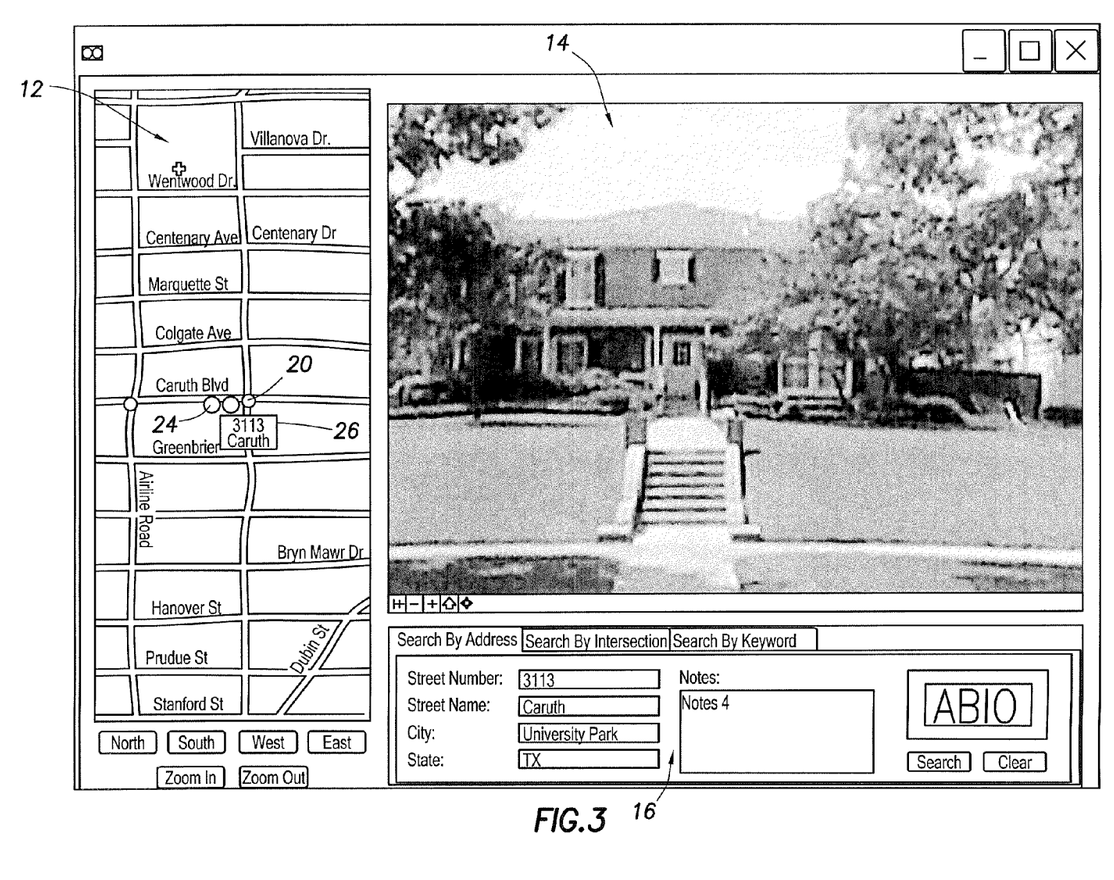
FIG. 3 presents the screen of FIG. 2 with the panoramic image rotated.

The panoramic image 14 is simultaneously displayed on the screen 10. The panoramic image 14 displayed corresponds to the location 20 indicated on the map image 12. The panoramic image 14 presents, preferably, a street-level view. The panoramic image 14 is a 360 degree image which can be panned, or "rotated," by the user such that the user sees an image looking out from the point of the panoramic image. (It is not intended that potential infringement could be avoided by allowing somewhat less than full rotation.) The image can be panned by the user using a mouse or other input device, as is known in the art. For example, in FIG. 3, the image from FIG. 2 has been panned to face another direction. Similarly, the image can preferably be zoomed in and out by the user. Further, the image may be tilted, that is, panned up and down. It is possible to use panoramic imaging technology to supply a spherical viewing of an image, that is, having a "top" and "bottom" as well as the cylindrical side. The panoramic image can be a photo or movie image, as is known in the art.

The panoramic image allows the user to virtually see what he would actually see were he present at the location physically. This provides a visual correlation between the map image and the panoramic image. This is particularly useful where the user is searching for real estate and wants a "feel" for the neighborhood, or is searching for a store or other location and wants to find a "landmark" to search for in person, wants to tour an area or building, see storefronts, etc.

Figure 4:
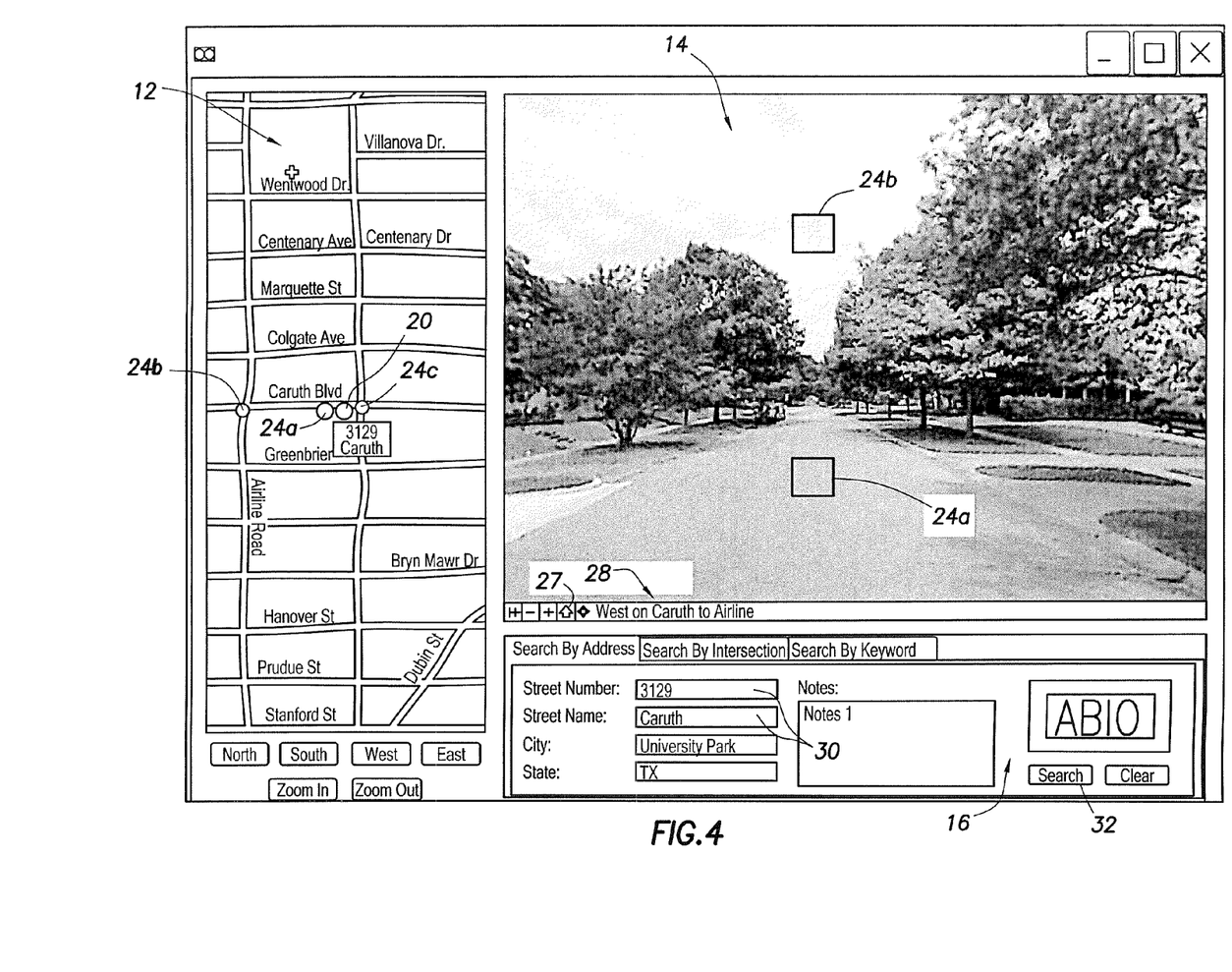
FIG. 4 presents a screen showing images and information corresponding to a separate panoramic image.

Embedded within the panoramic image 14 are hotspots or links 24. These hotspots 24 correspond to the hotspots 24 in the map image 12. For example, as seen in FIG. 4, hotspot 24a in the panoramic image corresponds to hotspot 24a in the map image. Similarly, hotspots 24b correspond. If the panoramic image 12 was rotated around, such that the view was facing east, a hotspot 24c would appear corresponding to the hotspot 24c in the map image. The panoramic image 12 can have one or several hotspots. Typically, the panoramic image 12 would not have both hotspots 24a and 24b, since they are both in the same direction, however, it is possible to have multiple hotspots linking as shown. For use of the invention in a town map, as shown, a panoramic image 12 at an intersection, such as at hotspot 24b, would typically have four hotspots, one in each direction of the intersection. Similarly, a panoramic image in the middle of a street, as in FIG. 4, might only have two hotspots. As shown, multiple hotspots in the same general direction would allow a user to "walk" down the street, image by image, or "skip" images, such as to the next intersection.

Note that the invention has other applications than just street maps and can be employed for navigation within buildings, at parks and monuments and other points of interest, or for other uses.

The hotspots 24 in the panoramic image 12 are indicated by square icons for reference, but, just as described above regarding hotspots within the map image, the hotspots can appear, be invisible, appear upon scroll-over or by selection of the user, such as by indicator 27 which will reveal all hotspots. The hotspots can appear as a separate icon or can be indicated by a mouse location icon changing shape or color.

Preferably, the panoramic images 12 "overlap" or provide a continuous photographic coverage of the geographical location. For example, in use with street touring or navigation, a panoramic image can be taken every fifty feet to provide a view of the entire street. This may not be possible, or necessary, obviously, where buildings, private property or other obstacles will not allow for an overlapping images.

Where the user indicates, on the map image 12, a location which does not have a corresponding panoramic image 14, the program can either center the map image at that location, in which case no hotspot will appear at the center of the map image, or, preferably, can automatically center the map image on the closest hotspot. The user can indicate, such as by pointing and clicking, any of the hotspots on the map image or panoramic image. Activating the hotspot automatically updates, or changes the map image 12 and the panoramic image 14 seen on the screen to the map and panoramic images corresponding to the activated hotspot. Further, it is possible to have the corresponding map image hotspot 24a become high-lighted, such as by appearing, changing colors, etc., when the user scrolls-over or otherwise indicates the corresponding hotspot 24a on the panoramic image 14, and vice versa.

Figure 5:
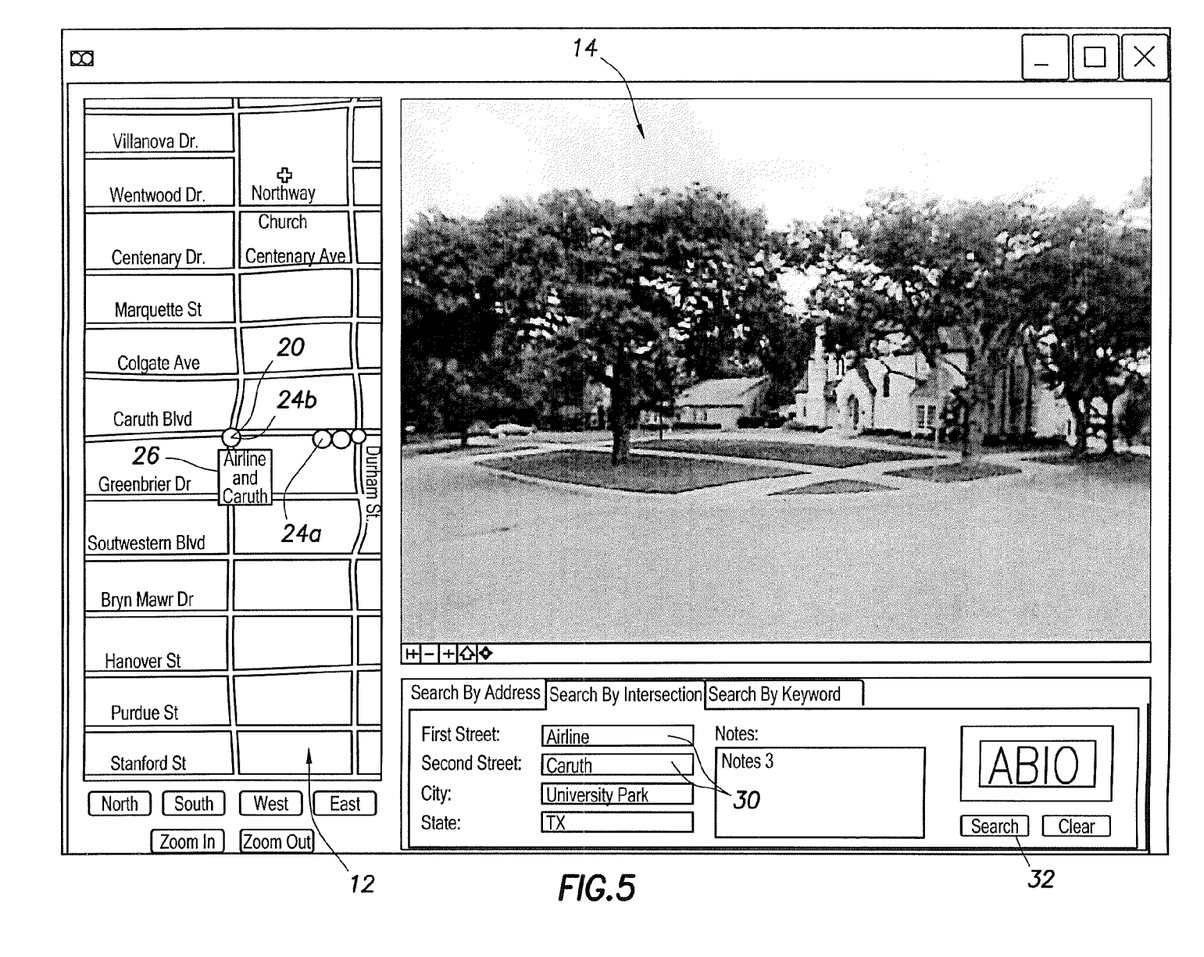
FIG. 5 presents a screen showing images and information corresponding to a separate panoramic image.

FIG. 5 is a screen 10 indicating the user has either linked to a hotspot 24b on the panoramic image of FIG. 4 or on the map image link 24b. Alternately, the user may have entered the intersection street information in the search fields 30 of the text panel 16, as explained below. Regardless of the method the user utilized to reach this location, the map image, the panoramic image and the text panel all are updated to display information corresponding to the chosen location.

Text panel 16 is also visible on the screen 10 simultaneously with map image 12 and panoramic image 14. The text panel 16 conveys textual information corresponding to the panoramic image, such as the address or intersection at the location of the panoramic image. Other information can be supplied, depending on the application, such as the name of a building, room or other location, pertinent historical or other information, etc. The text panel 16 can include information such as directional or linking information 28. That is, the directional information 28 in FIG. 4 reads "West on Caruth to Airline" which may indicate the direction (west) the user is facing on Caruth Blvd., and that he is facing towards Airline Road at the next intersection. Alternately, the information 28 could read "3129 Caruth" to indicate the location of the shown panoramic image (and map image location). In another embodiment, the information 28 can be information regarding the hotspot link the user has indicated, by scrolling-over, for example. In that case, in FIG. 4, as the user scrolled-over hotspot 24b in the panoramic image, the information 28 would read "West to the Caruth and Airline intersection," for example. If the user scrolled-over the hotspot 24a, the text would read "West to 3145 Caruth," for example. Similarly, if the hotspot linked to a building or other point of interest the information 28 would indicate the name or other information regarding that hotspot image. The image itself can have ordinate directions (N, S, E, W) on the panoramic image itself, preferably located at the bottom of the image so that it is more obvious which direction the user is facing in the panoramic image. Note that although the text panel as shown is located in one part of the screen 10, in another embodiment the text could be located in multiple locations.

Figure 6:
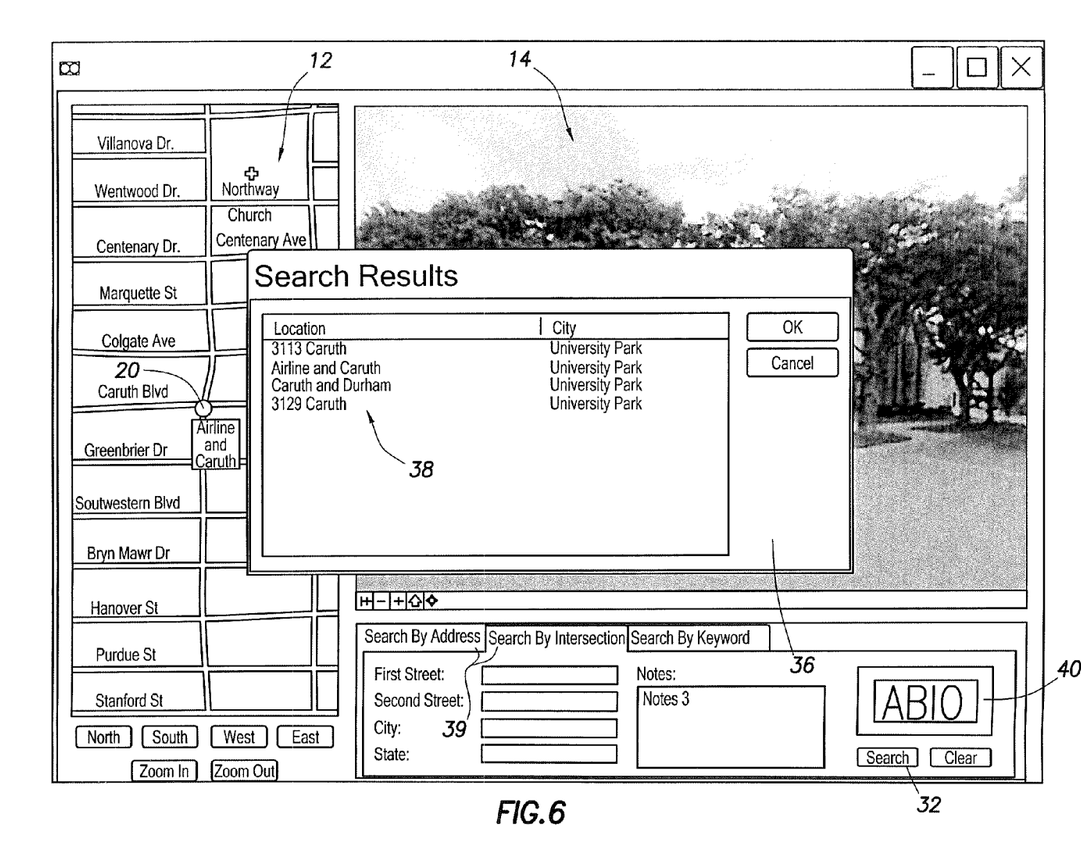
FIG. 6 presents a screen having multiple search results displayed.

The text panel 16 also includes search text input fields 30, seen in FIGS. 4 and 5, for example. The user can input textual information in the fields 30 and initiate or activate a search based on those terms. For example, in FIG. 2, the user may have entered the Street Number "3113" and the Street Name "Caruth." In FIG. 5, the text fields are streets which intersect. Upon activation of the search, such as by activating indicator 32, the program would initiate a search of a text database 34 stored on a computer readable medium. If matching information is found, the program automatically updates the map image, such as by shifting or centering the map, and panoramic image, by displaying the image corresponding to the entered criteria and map location. If more than one match is returned based on the search criteria, such as in FIG. 6, a pop-up box 36 can appear on the screen 10 listing the available matches 38. The matches 38 are also embedded links or hotspots that, when activated, will update the map and panoramic images to correspond to the selected hotspot or link. The pop-up box 36 would then disappear. The pop-up box 36 is only one embodiment of such a feature. The information regarding multiple search results could appear within the text panel, elsewhere on the screen or otherwise.

The search feature of the text panel can include other search mechanisms, such as searching by keyword, address, street intersections, zip code, GPS coordinates, etc. For example, keywords might include such points of interest as parks, churches, schools, pizza parlors, etc. The keywords will obviously depend on the application. The text panel 16 can include tabs 39, if desired, to switch from one type of search criteria to another. If a search keyword is employed, in one preferred embodiment, the text panel or a pop-up panel would list all of the locations matching the keyword which appear on the map image. Alternately, the closest locations matching the keyword can be shown. The search feature can employ other techniques known in the art, such as searching for alternate spellings, locating the closest address, suggesting alternate search terms, indicating a successful or unsuccessful search, etc.

The text panel can include other information, such as advertising or provider information, such as a logo 40. The text panel can also indicate GPS coordinates corresponding to the panoramic image or hotspot. Similarly, the text search fields can allow searching by such criteria. The text database includes all textual information corresponding to a panoramic image.

Figure 7:
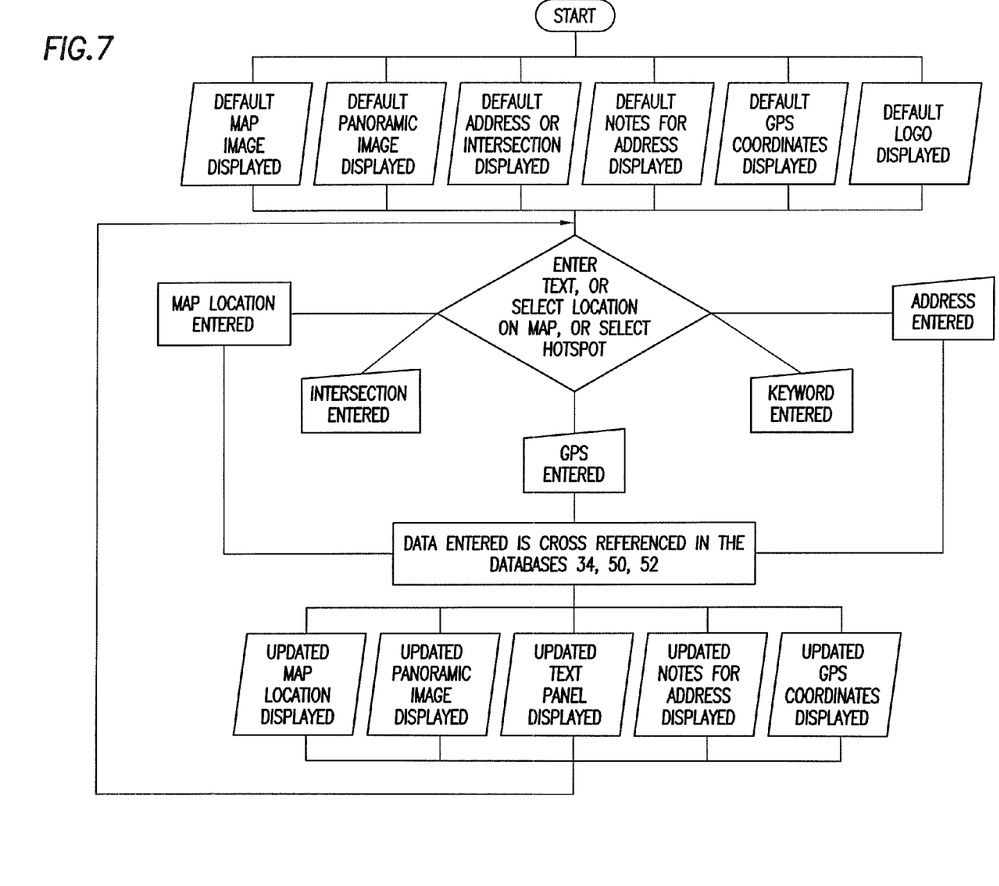
FIG. 7 presents a sample logic tree of the invention.

In use, the application provides a method and apparatus for simultaneously viewing navigable panoramic images, corresponding navigable map images and textual data and allows input to searchable text fields. FIG. 7 presents a logic chart of one embodiment of the invention. At start-up, the screen displays a set of default information, as indicated: default map image, default panoramic image, default textual information, default GPS coordinates, default logo and other default data as desired. The system can eliminate some or all of the default data. For example, the screen can show only nominal information, such as search fields in the text panel, and not display any map or panoramic images until the user indicates a desired field of search.

The user enters search field criteria, such as an address, zip code, GPS coordinates, a keyword, etc., or the user can activate a hotspot in either the map or panoramic images. Depending on the action of the user, the program will undertake different actions. Data for searching and cross-referencing is stored in computer-readable media in databases. A panoramic image database 52 stores the plurality of panoramic images. A map database 50 stores the map image or images. A text database 34 stores the text data corresponding to the panoramic images. The text data can include multiple data for a single panoramic image, such as the data types discussed herein. The data in storage in the databases is cross-referenced to gather corresponding information and data. The cross-correlation can be accomplished by various means known in the art, including by creating cross-reference databases in Access (trademark) software commercially available from Microsoft Corp. Selected images and data are then displayed on the screen. The process is repeated based on the actions of the user and the screen is updated or changed to display the panoramic image, map image and text data corresponding to the user's action.

For example, if a hotspot was activated from within the map image or panoramic image, the program will cross-reference all data associated with that hotspot, such as the corresponding map image location, the corresponding panoramic image and any corresponding textual data, whether the data is to be displayed or not. For example, the GPS coordinates associated with a panoramic image may be accessed and used to cross-reference to a location on the map image, but those coordinates may not be displayed on the screen. Some data corresponding to the hotspot may not be displayed because the user has indicated to hide the information or has not clicked on the text tab which would display that information. The information to be displayed will include a panoramic image corresponding to the hotspot, a map image corresponding to the panoramic image and text information to be displayed in the text panel. Other information may be displayed as well, as desired or as indicated by the user.

Similarly, if the user entered search criteria in the text panel search fields 30, the program would initiate a search based on that criteria. If a single search result is returned, or if the user selects one of a series of search results, the panoramic image, map image and possibly text data are updated or changed to display the information corresponding to the search result or selection.

The process can be repeated as desired. The invention provides corresponding panoramic images, map images and text information, including search fields, for a selected geographic area. The user has simultaneous access to the map and panoramic images and the textual panel.

GPS coordinates can be used to "place" location points on the map image automatically. This can be accomplished by using Pepperwhite Street Map (trademark) from Pepperwhite Corp. available at www.pepperwhite.com. Similarly, equipment and software, such as GPS-Photo Link is commercially available from GeoSpatial Experts (trademark) and links photographs with GPS coordinates.

The apparatus and methods in the embodiments shown and described above are only exemplary. Therefore, many details are neither shown nor described. Even though numerous characteristics and advantages of the present inventions have been set forth in the foregoing description, together with details of the structure and function of the inventions, the disclosure is illustrative only, and changes may be made in the detail, especially in matters of shape, size and arrangement of the parts within the principles of the inventions to the full extent indicated by the broad general meaning of the terms used in the attached claims. The restrictive description and drawings of the specific examples above do not point out what an infringement of this patent would be, but are to provide at least one explanation of how to make and use the inventions. The limits of the inventions and the bounds of the patent protection are measured by and defined in the following claims.

It is claimed:

1. A method of simultaneous display of map and image data, comprising the steps of:
    (a) displaying on a computer screen at least one of a plurality of panoramic images stored in a non-transitory computer readable media, the at least one panoramic image corresponding to a geographical location, the panoramic image navigable in response to input by a user;
    (b) displaying on the computer screen, simultaneously with displaying the at least one panoramic image, at least one map image corresponding to the at least one panoramic image, wherein the map image is navigable in response to input by the user; and (c) displaying on the computer screen, simultaneously with displaying the at least one panoramic image and the at least one map image, textual information corresponding to the at least one panoramic image.

2. The method of claim 1 further comprising the step of: (d) updating the displayed panoramic image, the displayed map image, and the displayed textual information, in response to a user navigating within the at least one panoramic image or on the at least one map image.

3. The method of claim 2, further comprising the step of: (e) repeatedly updating corresponding panoramic images, map images, and textual information in response to user inputs.

4. The method of claim 1, wherein the panoramic image is navigable in response to a user input from a mouse, keyboard, or other user input device.

5. The method of claim 1, wherein the panoramic image is navigable by rotating, zooming in or out, panning left or right, or panning up or down within the panoramic image.

6. The method of claim 1, wherein the panoramic image is navigable by user activation of any of one or more hot spots or links embedded in the panoramic image.

7. The method of claim 6, wherein a hot spot or link corresponds to a geographical location adjacent to the geographical location of the displayed panoramic image.

8. The method of claim 6, wherein the displayed panoramic image includes a plurality of hot spots or links corresponding to a plurality of geographic locations adjacent one another.

9. The method of claim 8, wherein the plurality of hot spots or links corresponds to a plurality of geographic locations along a street, and wherein the panoramic image is navigable to virtually walk down the street from one of the hot spots or links to another.

10. The method of claim 8, wherein the hot spots or links are visible in the panoramic image only upon scroll-over by a user.

11. The method of claim 1, wherein the plurality of panoramic images are 360 degree images.

12. The method of claim 1, wherein the plurality of panoramic images are spherical or curved images.

13. The method of claim 1, wherein the plurality of panoramic images are photographic or movie images.

14. The method of claim 1, wherein the plurality of panoramic images includes overlapping panoramic images for providing continuous coverage of at least one geographical location.

15. The method of claim 1, wherein the plurality of panoramic images each allow a user to virtually see what one would actually see if present at the geographical location physically.

16. The method of claim 15, wherein the plurality of panoramic images provide street level views.

17. The method of claim 1, wherein the plurality of panoramic images provide an image looking out from the point where the panoramic image was taken.

18. The method of claim 1, wherein the plurality of panoramic images correspond to points of interest.

19. The method of claim 1, wherein the plurality of panoramic images, map images, and textual information are displayed in an automobile.

20. The method of claim 1, wherein images and textual information are provided for personal or commercial automobile navigation.

21. The method of claim 1, wherein the at least one map image is an overhead representational map or overhead photographic map.

22. The method of claim 21, wherein information is superimposed onto the at least one map image.

23. The method of claim 22, wherein the information superimposed on the at least one map image is street names, zip codes, landmarks, points of interest, parks, reserves, state and country borders, or bodies of water.

24. The method of claim 1, wherein the at least one map image is navigable by zooming in and out, activating directional indicators, centering the map image about a selected geographical location, pointing and clicking, or activating a hot spot or link embedded in the at least one map image.

25. The method of claim 24, wherein the at least one map image has a plurality of embedded hot spots or links each corresponding to a plurality of geographical locations and to at least one of the plurality of panoramic images.

26. The method of claim 25, further comprising displaying hot spots or links upon scroll-over by a user.

27. The method of claim 25, further comprising displaying corresponding data on at least two of the at least one map image, the displayed panoramic image, and the textual information on the computer screen in response to a user activating or scrolling-over an embedded hot spot or link in either the at least one map image or panoramic image.

28. The method of claim 1, further comprising the step of updating the at least one map image by centering the at least one map image about a geographical location selected by a user or about a hot spot or link closest to the geographical location selected.

29. The method of claim 1, further comprising displaying information on the at least one map image about the geographical location upon which the at least one map image is centered, or about a hot spot or link embedded in the at least one map image.

30. The method of claim 29, wherein the displayed information on the at least one map image appears always, upon scroll-over, or when indicated by a user.

31. The method of claim 1, further comprising displaying a location icon on the at least one map image.

32. The method of claim 1, wherein the textual information comprises at least one of GPS coordinates, a street name, an address, zip code, intersection, or information regarding a point of interest or geographical location.

33. The method of claim 1, wherein the textual information is displayed on the computer screen in a text panel.

34. The method of claim 1, further comprising displaying advertising.

35. The method of claim 34, wherein the textual information is displayed on the at least one map image, the at least one of a plurality of panoramic images, or a text panel.

36. The method of claim 1, further comprising displaying at least one search input field.

37. The method of claim 36, further comprising the step of initiating a search in a database in response to a user search input.

38. The method of claim 37, further comprising the step of updating the at least one of a plurality of panoramic images, at least one map image, and textual information in response to a user search input.

39. The method of claim 36, further comprising displaying a list of information corresponding to a user input.

40. The method of claim 39, wherein the list of information has a plurality of hot spots or links embedded therein.

41. The method of claim 36, wherein the at least one search input field is displayed in a text panel.

42. The method of claim 36, further comprising displaying a list of results in response to a user search, the results organized by distance from a particular location on the at least one map, or whether the results are associated with geographical locations appearing on the displayed at least one map.

43. The method of claim 1, further comprising the step of cross-referencing at least one of the plurality of panoramic images, at least one map image, and textual information.

\* \* \* \* \*